Figure 1:
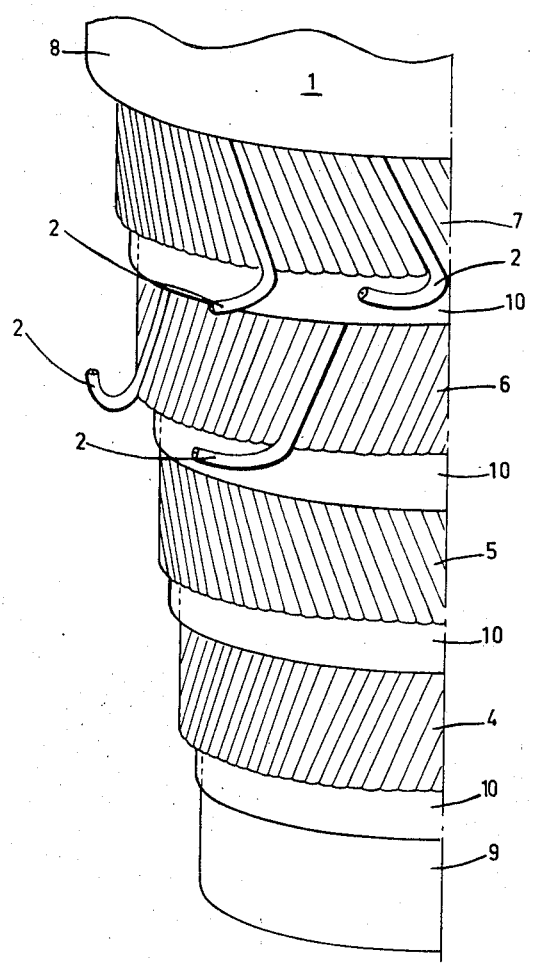

United States Patent
Chevalier et al.

[15] 3,641,658
[45] Feb. 15, 1972

[54] PROCESS FOR COUPLING TO A CONNECTING ELEMENT AN ELONGATED FLEXIBLE MEMBER INCLUDING LINES FOR REMOTE TRANSMISSION OF POWER OR DATA

[72] Inventors: Andre Chevalier, Pantin; Pierre Grolet, Viroflay; Remi Reynard, Montesson, all of France

[73] Assignee: Institut Francais du Petrole, des Carburants et Lubrifiants, Rueil Malmaison (Hauts de Seine), France

[22] Filed: Apr. 20, 1970

[21] Appl. No.: 30,084

[30] Foreign Application Priority Data

Apr. 23, 1969 France..............................6912939

[52] U.S. Cl..........................29/423, 29/508, 285/149, 285/256
[51] Int. Cl..........................................B23p 17/00
[58] Field of Search.................29/423, 508; 285/149, 256

[56] References Cited

UNITED STATES PATENTS

| | | | |
|---|---|---|---|
| 1,661,835 | 3/1928 | Keller | 29/423 |
| 2,321,991 | 6/1943 | Butler | 29/508 |
| 2,452,728 | 11/1948 | Carling | 29/508 X |
| 2,463,293 | 3/1949 | Mentel | 29/208 UX |
| 2,535,460 | 12/1950 | Rotter et al. | 285/149 |
| 2,804,681 | 9/1957 | Brueckner | 29/423 X |
| 3,055,682 | 9/1962 | Bacher et al. | 285/149 |
| 3,529,853 | 9/1970 | Triest et al. | 285/256 X |

*Primary Examiner*—Charlie T. Moon
*Attorney*—Craig, Antonelli, Stewart and Hill

[57] ABSTRACT

This process makes it possible to couple to a connecting element an elongated flexible member having electric or hydraulic lines contained in at least one armouring of metallic wires, without causing any damage to these electric or hydraulic lines.

It consists in drawing through a die an auxiliary ring covering the amouring, so as to make the metallic rigid metallic bars locally substituted for the electric or hydraulic lines, penetrate into an underlaying anchoring ring. The auxiliary ring and the bars are then removed and the electric or hydraulic lines placed in the grooves or farrows hallowed in the anchoring ring by the bars. A clamping ring surrounding the so constituted assembly is then sompressed by an additional drawing operation through a die.

1 Claims, 3 Drawing Figures

PROCESS FOR COUPLING TO A CONNECTING ELEMENT AN ELONGATED FLEXIBLE MEMBER INCLUDING LINES FOR REMOTE TRANSMISSION OF POWER OR DATA

The present invention relates to a process for coupling to a connecting element a free end of an elongated flexible member, such as a cable or a flexible pipe, provided with at least one armouring of wires or strands, wherein at least one electric or hydraulic line for transmission of power or data is substituted for at least one wire or strand of said armouring.

When using an elongated flexible member including electric or hydraulic lines, it is often necessary to secure to the ends of this flexible member connecting elements constituted, in particular, by devices enabling, for example, to connect this elongated member to another elongated member such as a pipe or a flexible line.

These connecting devices must, in addition to their function of mechanical connection, provide for the continuity of the electric or hydraulic lines.

This problem arises in particular, but not exclusively, when sections of a flexible drill pipe, including electric or hydraulic lines, are to be connected one another.

Such a pipe must be capable of transmitting traction forces up to some hundreds tons and torsional forces or torques of some hundreds kilograms x meters, and, consequently, for coupling this pipe to a connecting element, it is necessary to apply very high mechanical strains, through constriction or shrinking, to the different elements constituting the pipe, at the end thereof.

The connecting devices used for this purpose in the prior art are provided with recesses wherein are housed the electric or hydraulic lines. In these recesses the electric or hydraulic lines are theoretically protected against any deterioration which could result from a constriction.

However, when the coupling has been achieved, it is impossible to make sure that the electric or hydraulic lines have not been partially damaged.

This is a very serious drawback, since any damage, even a partial one, of the electric or hydraulic lines may result in substantial time losses if it leads in operation to a failure in the power or data transmission through the line.

The main object of the invention is accordingly to provide a process for coupling a connecting element to an elongated flexible member including electric or hydraulic lines for the transmission of power or data, enabling the aforementioned drawbacks to be obviated and whereby it is possible to obtain a connection of substantially the same diameter as the elongated member and to provide for internal passages for the electric or hydraulic lines of the elongated member.

According to the invention, there is provided a process for coupling a connecting element made of a hard material having a jagged external wall to one end of an elongated flexible member, including at least one armouring of metallic wires in which at least one transmission line is substituted for at least one wire of the armouring, comprising the steps of inserting said connecting element into the end of said flexible member, placing between said connecting element and said armouring at least one connecting ring made of a material of lower hardness than that of the armouring and that of the connecting element, so that the end of said armouring lays on said anchoring ring, folding aside the end of said transmission line substantially over the length of the elongated member, in which the connecting member is inserted, substituting a metallic bar for said transmission line folded aside, covering the end of the armouring with an auxiliary compression ring, drawing the so-constituted assembly through a die, thereby producing, through a high diameter reduction of said compression ring, a penetration of said armouring and of said metallic bar into said anchoring ring and, at the same time an inlaying of the material constituting said anchoring ring between the jags of the jagged external wall of the connecting element, thereafter removing said auxiliary ring and said metallic bar and folding back along said anchoring ring said end of the transmission line which had been previously folded aside, at the place left free by said removed metallic bar, substituting a clamping ring for said auxiliary ring and finally compressing the so-constituted new assembly by an additional drawing operation through a die.

Figure 2A:
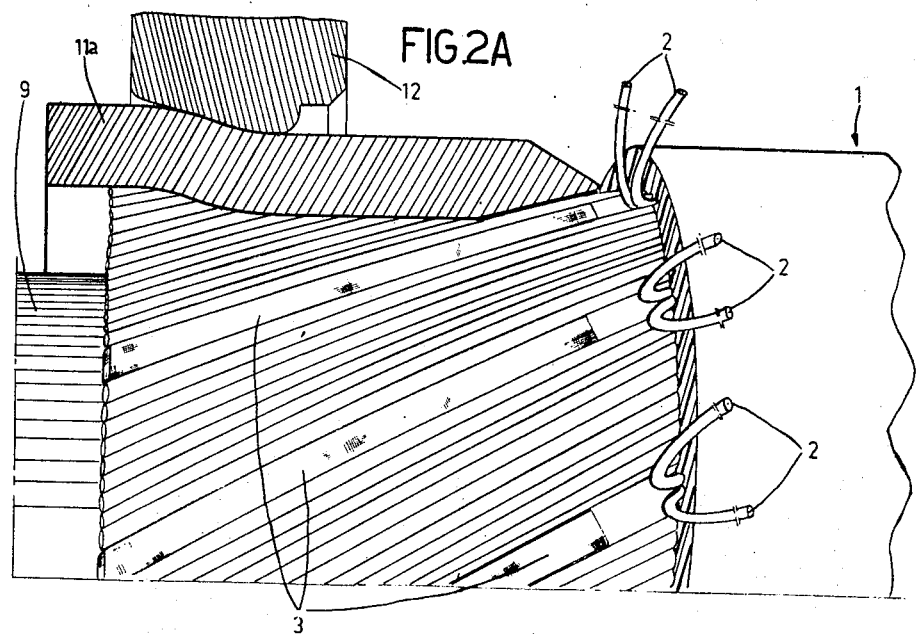
Figure 2B:
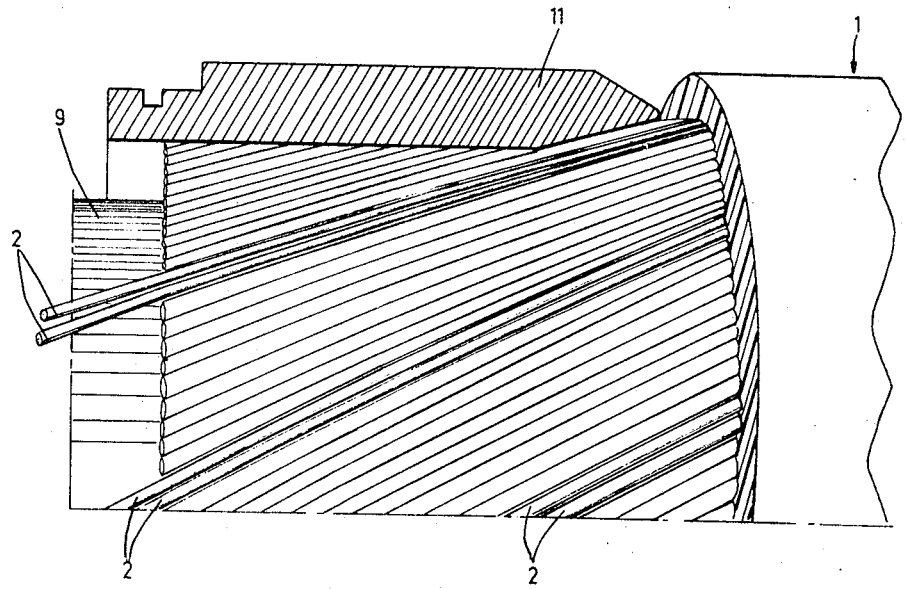

The invention will be easily understood and other advantages thereof apparent from the following description of nonlimitative embodiments illustrated by the appended drawings wherein:

FIG. 1 shows a flexible pipe including electric or hydraulic lines and a rigid tubular element to which this pipe must be coupled, FIG. 2A and 2B illustrate two steps of the coupling process according to the invention.

In FIG. 1, the reference numeral 1 designates a flexible pipe having a core of elastomeric or thermoplastic material and two external armourings consisting of helical windings of metallic wires or strands.

The first external armouring of this pipe, formed by the layers 4 and 5 of wires, cables or strands, withstand the pressure prevailing inside the pipe.

The second external armouring, formed by the layers 6 and 7 of wires, cables or strands withstand traction forces and torsion torques applied to the pipe.

In these last-mentioned layers, electric conductors or cables 2 used for the transmission of power or data are substituted for some of the wires, cables or strands of the armourings.

These different armouring layers are wound with suitable respective pitches, in a manner well known to those skilled in the art.

The reference numeral 8 designates the external coating of elastomeric or plastic material of the flexible pipe 1.

The rigid element to be connected with flexible pipe 1 is a tubular element designated by reference numeral 9. This element is made of a very hard material, such as for example steel having a tensile strength of 180 kg./mm.$^2$. The tubular element has an internal diameter equal to the internal diameter of the pipe and has a jagged external wall (this jagged outline is not shown in the drawings), which is for example obtained by machining.

In order to achieve the desired coupling, each external armouring is laid onto an anchoring ring 10 of small thickness, as shown in FIG. 1, this ring being made of a material such as annealed copper, of lower hardness than the armourings (4,5) and (6,7) and than the tubular element 9.

FIGS. 2A and 2B illustrate the steps of the process according to the invention, for coupling one end of the flexible pipe 1 with the rigid tubular element 9.

At the place where the pipe 1 must be connected to the tubular element 9, the conductors or lines 2 embedded in the strand layer 6 (FIG. 2A) are transferred from this layer to the overlaying layer 7, by exchanging each of said lines with a strand of layer 7.

Thereafter rigid metallic bars 3 are substituted for the lines 2 in layer 7, over the length necessary for the connection. The bars 3 thus lay on the same anchoring ring as the strands of layer 7.

Around the layers 7 is placed an auxiliary compression ring 11a, which may be made of steel, and the so-constituted assembly is drawn through a die 12. This drawing operation, which, in this embodiment, is effected at room temperature, produces, through a high reduction in the diameter of the auxiliary ring 11a, the penetration of the armouring layers into their respective anchoring rings 10 and at the same time (FIG. 2A) the penetration of the bars 3 into the ring 10 on which these bars lay as well as a penetration of the jags of the jagged external wall of tubular element 9 into the overlaying anchoring ring 10.

The auxiliary ring 11a (FIG. 2B) is then removed, for example by sawing it and the bars 3 are also removed, these bars having generated furrowlike marks in the adjacent ring 10.

As a result of the strong compression to which has being subjected the auxiliary ring 11a during the drawing operation, the strands of the armouring layers, and more particularly those of layer 7, do not escape from the grooves or furrows which they have hollowed and consequently when lines or conductors 2 are substituted for the bars 3 there is no risk for these lines of being compressed between the adjacent strands of layer 7 and thus they will not be subjected to any deterioration during the drawing operation of the permanent clamping ring 11 (FIG. 2B).

After lines 2 have been placed back to their initial position, a clamping ring 11 is placed around layer 7 and the so-constituted assembly is drawn through a die (FIG. 2B) as above indicated. Since the connecting assembly has already been compressed during the drawing operation performed on the auxiliary compression ring, the reduction in the diameter of the clamping ring 11 during this second drawing operation is less important than that of the auxiliary ring 11a during the first drawing operation.

It is sufficient for this new drawing operation to provide for the penetration of the strands of the external layer 7 into the clamping ring 11 which is for example made of a steel of lower hardness than that of the steel constituting the strands of armouring 7.

According to a preferred embodiment, providing an effective clamping effect by ring 11, this ring 11 and the connecting element 9 are made fast with each other in axial displacement, during the operation of drawing through the die.

Changes may be made without departing from the scope of the present invention.

For example sealing at the place of the connecting device may be obtained by a filling of elastomer between the clamping ring and the external coating of the flexible elongated member such as pipe 1. The flexibility of this elongated member may be made progressively variable in the vicinity of the connecting device by using an elastic device surrounding the flexible elongated member.

It will also be possible to extend the connecting element with any suitable device enabling for example an apparatus or tool to be connected to the end of the elongated member or pipe 1, or to adapt to the connecting element a device which makes it possible to detachably connect the elongated member to another member such as a pipe.

What we claim is:

1. A process for coupling a connecting element, made of a hard material having a jagged external wall, to one end of an elongated flexible member, including at least one armouring of metallic wires in which at least one transmission line is substituted for at least one wire of the armouring, comprising the steps of inserting said connecting element into the end of said flexible member, placing between said connecting element and said armouring at least one connecting ring made of a material of lower hardness than that of the armouring and that of the connecting element, so that the end of said armouring lays on said anchoring ring folding aside the end of said transmission line substantially over the length of the elongated member in which the connecting member is inserted, substituting a metallic bar for said transmission line folded aside, covering the end of the armouring with an auxiliary compression ring, drawing the so-constituted assembly through a die, thereby producing, through a high reduction in the diameter of said compression ring, a penetration of said armouring and of said metallic bar into said anchoring ring and, at the same time, an inlaying of the material constituting said anchoring ring between the jags of the jagged external wall of the connecting element, thereafter removing said auxiliary ring and said metallic bar and folding back along said anchoring ring said end of the transmission line which had been previously folded aside, at the place left free by said removed metallic bar, substituting a clamping ring for said auxiliary ring and finally compressing the so-constituted new assembly by an additional drawing operation through a die.

* * * * *